United States Patent [19]

Goldsmith et al.

[11] Patent Number: 5,037,457
[45] Date of Patent: Aug. 6, 1991

[54] STERILE HYDROPHOBIC POLYTETRAFLUOROETHYLENE MEMBRANE LAMINATE

[75] Inventors: Paul S. Goldsmith, Peabody; Claire M. Carey, Framingham; Donald E. Keeley, Dunstable; Vinay Goel, Acton, all of Mass.

[73] Assignee: Millipore Corporation, Bedford, Mass.

[21] Appl. No.: 490,124

[22] Filed: Mar. 7, 1990

Related U.S. Application Data

[63] Continuation of Ser. No. 284,514, Dec. 15, 1988, abandoned.

[51] Int. Cl.$^5$ ................ B01D 53/22; B01D 71/48
[52] U.S. Cl. ........................... 55/158; 55/159; 156/162; 156/289; 156/309.6; 428/480
[58] Field of Search ............ 55/16, 158, 159; 156/162, 164, 184, 289, 308.2, 309.6; 428/480, 483

[56] References Cited

U.S. PATENT DOCUMENTS

| | | | |
|---|---|---|---|
| 2,732,092 | 1/1956 | Lawrence | 55/158 X |
| 3,332,216 | 7/1967 | Stern | 55/158 |
| 3,523,408 | 8/1970 | Rosenberg | 55/159 |
| 3,575,170 | 4/1971 | Clark | 55/159 |
| 3,668,837 | 6/1972 | Gross | 55/158 |
| 3,735,562 | 5/1973 | Mousseau, Jr. et al. | 55/158 |
| 3,767,500 | 10/1973 | Tally et al. | 156/289 X |
| 3,769,137 | 10/1973 | Moriyama et al. | 156/289 X |
| 3,778,971 | 12/1973 | Granger et al. | 55/159 |
| 3,797,202 | 3/1974 | Neulander et al. | 55/158 |
| 3,854,907 | 12/1974 | Rising | 55/159 |
| 3,909,302 | 9/1975 | Mermelstein | 55/158 X |
| 3,969,174 | 7/1976 | Kelly et al. | 156/289 X |
| 4,109,543 | 8/1978 | Foti | 156/309.6 X |
| 4,190,426 | 2/1980 | Ruschke | 55/159 X |
| 4,278,084 | 7/1981 | Pope, Jr. | 55/159 X |
| 4,525,182 | 6/1985 | Rising et al. | 55/159 |
| 4,735,854 | 4/1988 | Lauchenauer | 156/289 X |
| 4,758,297 | 7/1988 | Calligarich | 156/309.6 X |
| 4,790,857 | 12/1988 | Miksch | 55/158 X |
| 4,929,303 | 5/1990 | Sheth | 156/309.6 X |

FOREIGN PATENT DOCUMENTS 2157188 10/1985 United Kingdom ................ 55/159

Primary Examiner—Robert Spitzer
Attorney, Agent, or Firm—Andrew T. Karnakis; Paul J. Cook

[57] ABSTRACT

A gamma radiation sterilized membrane laminate is provided comprising a porous polytetrafluoroethylene membrane directly laminated to a porous polyester web substrate. The laminate is hydrophobic and has a burst strength when unsupported of at least 10 psi in both the forward and reverse direction of filtration after the laminate is exposed to radiation.

6 Claims, No Drawings

STERILE HYDROPHOBIC POLYTETRAFLUOROETHYLENE MEMBRANE LAMINATE

This is a continuation of co-pending application Ser. No. 07/284,514 filed on Dec. 15, 1988, now abandoned.

BACKGROUND OF THE INVENTION

This invention relates to a porous, sterile hydrophobic polytetrafluoroethylene (PTFE) membrane laminate product and to a process for making the same. More particularly, this invention relates to a sterile PTFE microporous or ultrafiltration membrane laminate formed from a hydrophobic PTFE membrane directly laminated to a porous web substrate which is mechanically resistant to pressure.

By the term "sterile" as used herein is meant a laminate which is rendered sterile by gamma radiation.

In many applications of membrane technology, it is desirable to utilize a membrane filter which is mechanically strong, is thermally stable, is relatively inert chemically and is insoluble in most organic solvents. It is desirable to provide such membranes which are also hydrophobic so that they are not wet under pressure by solutions including solutions that contain surfactants. Hydrophobic membranes are not permeable to aqueous solutions even under moderate solution pressures and thus such membranes are useful as a seal to aqueous solutions while, at the same time, being permeable to gases.

Prior to the present invention, PTFE membranes have been sterilized with ethylene oxide gas or by gamma radiation. The use of ethylene oxide is undesirable since the gas is toxic and causes a pollution problem. Gamma radiation also is undesirable since it reduces the mechanical strength of the PTFE membrane so that it is not capable of withstanding moderate pressure in the forward or reverse direction of filtration. Therefore, it would be desirable to provide a sterile PTFE membrane capable of withstanding elevated pressures while avoiding the use of toxic sterilizing compositions.

SUMMARY OF THE INVENTION

This invention provides a sterile hydrophobic composite porous membrane comprising a porous polytetrafluoroethylene membrane heat laminated to a porous polyester web substrate. The laminate is rendered sterile by exposure to gamma radiation. The unsupported sterile laminate has a burst strength of at least 10 psi in both the forward and reverse directions of filtration. Unlike the composite membrane products of the prior art, the polytetrafluoroethylene membrane is directly laminated onto the polyester substrate without the utilization of an intermediate binding or adhesive composition. The laminate is produced by winding the membrane and the polyester web on a core with a nonadhesive web which separates adjacent wound laminate under conditions to effect adherence of the membrane and the web to each other to form a two-layer laminate.

DESCRIPTION OF SPECIFIC EMBODIMENTS

In accordance with this invention, a PTFE porous membrane is directly laminated on one surface to a porous polyester web. Lamination is achieved directly without the use of an intervening material such as an adhesive. Lamination is effected by heating, an interleaved roll of the PTFE membrane, the polyester web and a protective web positioned between one surface of the polyester and one surface of the PTFE wound on a roll at a temperature between about 170° C. and 220° C. for a time sufficient to effect the lamination, usually between about 30 minutes and 7 hours. The lamination of the polyester web to the porous PTFE membrane is effected so that the entire surface of the porous membrane is laminated to the web otherwise the unlaminated portion of the membrane is mechanically weakened when subsequently exposed to sterilizing gamma radiation. Surprisingly, it has been found that the laminates formed by passing the PTFE membrane and the polyester web between heated rolls under pressure does not produce a mechanically strong product resistant to gamma radiation by passing them in contact with each other between heated rolls under pressure. Generally, the porous PTFE membrane has an average pore size between about 0.001 and 10 microns and more usually between about 0.1 and 5.0 microns. The polyester web can be woven or non-woven so long as it has open pores which permit the passage of gas therethrough.

It is desirable to avoid the use of an adhesive to form the laminate since it has been found that laminates so-produced, when subsequently exposed to sterilizing gamma radiation is mechanically weakened. The laminates of this invention, after being sterilized by exposure to gamma radiation, usually between about 2.5 and 5 mega Rad are capable of withstanding a forward or reverse pressure of at least 10 psi. As used herein pressure in the forward direction is applied to the PTFE surface while pressure in the reverse direction is applied to the polyester surface of the laminate. In addition, the sterilized membrane laminates of this invention retain a desirable degree of hydrophobicity such that it is not wet by aqueous solutions including solutions containing a surfactant. The laminates are useful as a gas vent to selectively pass gas therethrough while preventing passage of aqueous liquids therethrough such as in the apparatus described and claimed in U.S. Pat. No. 3,854,907 which is incorporated herein by reference. Thus, the laminates of this invention can be utilized as a seal for aqueous liquids. In addition, the laminates of this invention can be utilized as a filter for gases.

EXAMPLE 1

This example illustrates the method of making the laminate of this invention and that the laminate so-produced is superior to laminates presently available.

A nonwoven polyester web, a PTFE membrane (0.02 micron pore size) and a sheet of paper were interwoven on a 3 inch O.D. metal core such that the polyester web and the PTFE membrane were contacted to each other only on one surface to form a roll 7 inches in diameter. The roll was heated at 210° C. for four hours in a circulating hot air oven. After cooling the roll was unwound and the resulting PTFE-polyester laminate was exposed to 5.0 MRad of gamma radiation.

Thereafter the laminate was tested to determine whether it remained hydrophobic and whether its mechanical strength was satisfactory. Disks, 13 millimeters in diameter, were cut from the laminate material. The PTFE membrane surface of the laminate was exposed to an aqueous multivitamin solution at a pressure of .15 pounds per square inch (psi) for 96 hours. Thereafter, the laminate disks were tested for resistance to air flow. The laminate retained greater than 75% of its original capacity to pass air. Thereafter, it is suitable as a gas vent membrane.

The mechanical strength of the laminate was evaluated using 13 millimeter diameter disks cut from the laminate material. Air pressure was applied to the polyester support surface of the laminate (reverse direction) and the pressure at which PTFE membrane burst was recorded. The average burst strength of the membrane in the reverse direction was 24 psi. In order to be used as a gas vent membrane, the burst strength of the laminate in the reverse direction must be at least 10 psi. The average burst strength in the forward direction was greater than 50 psi.

In contrast, a laminate membrane comprising a PTFE membrane (0.02 micron pore size) adhered with an adhesive to a polyester support after being irradiated with 5.0 MRad of gamma radiation had a burst strength in the reverse direction of 7 psi under the test conditions set forth above. Thus, these laminate membranes were not useful as gas vent membranes.

EXAMPLE 2

The laminate preparation described in Example 1 was repeated using a PTFE membrane with a pore size of 0.2 microns, an oven temperature of 222° C. and oven times of 6 hours. The resulting PTFE-polyester membrane laminate was exposed to 5.0 MRad of gamma radiation.

The hydrophobic nature and the mechanical strength of the laminate were evaluated as described in Example 1. After exposure to an aqueous multivitamin solution at 15 psi for 96 hours, the laminate retained greater than 75% of its original airflow. The average burst strength of the laminate was 21 psi. Both of these test results show that this laminate is a successful vent membrane.

EXAMPLE 3

This example illustrates that a PTFE membrane laminate produced by a conventional heat lamination process wherein the laminate is exposed to gamma radiation does not produce a product having satisfactory mechanical strength. A polytetrafluoroethylene membrane (FGUP) is placed on top of nonwoven polyester support material (Hollytex 3252). This two layer substrate was fed into a nip roll laminator using either one of two following process conditions:

Temperature: 204° C.
Line Speed: 4 Feet/minute
Residence Time on Heated Roll: 7.5 seconds.

or

Temperature: 210° C.
Line Speed: 4.3 Feet/minute
Pressure: 50 Newtons/centimeter
Residence Time on Heated Roll: 46 seconds.

The membrane laminate produced under either process conditions had no mechanical strength after exposure to 5 Mega Rads of gamma radiation.

EXAMPLE 4

A polytetrafluoroethylene membrane (FGUP), a nonwoven polyester (Hollytex 3252) and a paper web capable of withstanding high temperature were interleaved on an aluminum core using the following process conditions:

Unwind Tensions: 25
Nip Pressure: 40 pounds/square inch
Roll Length: 180 feet

This roll was placed in a circulating hot air oven at 220 degree C. for 6 hours, followed by rewinding and removal of the paper.

The membrane laminate produced with this process could withstand greater than 50 one second pulses of 10 psi pressure in the reverse direction after exposure to 5 MegaRads of gamma radiation.

We claim:

1. A laminate membrane product which comprises a porous polytetrafluoroethylene membrane laminated directly in the absence of an adhesive to a gas permeable polyester web, said laminate being hydrophobic and having a burst strength as measured with an unsupported 13 millimeter diameter disk of said laminate of at least 20 psi in a forward direction and in a reverse direction, after said laminate is exposed to gamma radiation.

2. The laminate of claim 1 wherein said polyester web is a woven web.

3. The laminate of claim 1 wherein said polyester web is a nonwoven web.

4. The process of producing the product of claim 1 which comprises winding (a) a polytetrafluoroethylene membrane and (b) a gas permeable polyester web in direct contact with each other and (c) a protective sheet between each layer consisting of said membrane and said web, heating said membrane, said web and said protective sheet subsequent to said winding for a sufficient time to effect lamination of said membrane to said web while preventing adjacent layers from laminating to each other and exposing said laminated web and membrane to gamma radiation to effect sterilization of said laminated web and membrane.

5. The process of claim 4 wherein said polyester web is a woven web.

6. The process of claim 4 wherein said polyester web is a nonwoven web.

* * * * *